(12) United States Patent
Wang et al.

(10) Patent No.: US 12,045,927 B2
(45) Date of Patent: Jul. 23, 2024

(54) RENDERER USING EXPLICIT OBJECT REPRESENTION VIA RAYS TRACING VOLUME DENSITY AGGREGATION

(71) Applicant: Lemon Inc., Grand Cayman (KY)

(72) Inventors: Peng Wang, Los Angeles, CA (US); Angtian Wang, Los Angeles, CA (US); Jian Sun, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 213 days.

(21) Appl. No.: 17/586,312

(22) Filed: Jan. 27, 2022

(65) Prior Publication Data
US 2023/0237728 A1    Jul. 27, 2023

(51) Int. Cl.
G06T 15/06     (2011.01)
G06T 17/10     (2006.01)
G06T 19/20     (2011.01)

(52) U.S. Cl.
CPC .............. *G06T 15/06* (2013.01); *G06T 17/10* (2013.01); *G06T 19/20* (2013.01); *G06T 2219/2021* (2013.01)

(58) Field of Classification Search
None
See application file for complete search history.

(56) References Cited

U.S. PATENT DOCUMENTS

2022/0301257 A1* 9/2022 Garbin ................... G06N 3/045

FOREIGN PATENT DOCUMENTS

CN     108198204    *  6/2018  .............. G06T 5/30

OTHER PUBLICATIONS

Waschbusch et al., "Scalable 3D video of dynamic scenes," Aug. 2005, Visual Comput, vol. 21, pp. 629-638 (Year: 2005).*
"PyTorch3D—Fit a mesh via rendering"; https://pytorch3d.org/tutorials/fit_textured_mesh; Meta Platforms, Inc .; © 2022; accessed May 18, 2022; 14 pages.
Blinn; "Light reflection functions for simulation of clouds and dusty surfaces"; ACM SIGGRAPH Computer Graphics; vol. 16 Issue 3; Jul. 1982; p. 21-29.
Genova et al.; "Local Deep Implicit Functions for 3D Shape"; IEEE/CVF Conference on Computer Vision and Pattern Recognition; 2020; p. 4857-4866.
He et al.; "Deep Residual Learning for Image Recognition"; IEEE Conference on Computer Vision and Pattern Recognition; 2016; p. 770-778.
Iwase et al.; "RePOSE: Fast 6D Object Pose Refinement via Deep Texture Rendering"; IEEE/CVF International Conference on Computer Vision; 2021; p. 3303-3312.

(Continued)

*Primary Examiner* — Andrew G Yang
(74) *Attorney, Agent, or Firm* — BakerHostetler

(57) ABSTRACT

The present disclosure describes techniques of rendering images using explicit object representation via rays tracing volume density aggregation. The techniques comprise reconstructing an object into a plurality of Gaussian ellipsoids; determining a volume density of each of the plurality of Gaussian ellipsoids along each of a plurality of viewing rays; determining a weight of each of the plurality of Gaussian ellipsoids based on the volume density; and synthesizing an image of the object using the determined weight on each pixel of the image to interpolate attributes of each of the plurality of Gaussian ellipsoids.

14 Claims, 16 Drawing Sheets

(56) References Cited

OTHER PUBLICATIONS

Kajiya et al.; "Ray tracing volume densities"; ACM SIGGRAPH Computer Graphics; vol. 18 Issue 3; Jul. 1984; p. 165-174.
Kato et al.; "Neural 3D Mesh Renderer"; IEEE Conference on Computer Vision and Pattern Recognition; 2018; p. 3907-3916.
Kingma et al.; "Adam: A Method for Stochastic Optimization"; 3rd International Conference for Learning Representations; arXiv:1412.6980; Jan. 2017; 15 pages.
Lassner et al.; "Pulsar: Efficient Sphere-Based Neural Rendering"; IEEE/CVF Conference on Computer Vision and Pattern Recognition; 2021; p. 1440-1449.
Lin et al.; "Microsoft COCO: Common Objects in Context"; European Conf. on Computer Vision; 2014; p. 740-755.
Liu et al.; "Material Editing Using a Physically Based Rendering Network"; IEEE International Conference on Computer Vision; 2017; p. 2261-2269.
Liu et al.; "Soft Rasterizer: A Differentiable Renderer for Image-Based 3D Reasoning"; IEEE/CVF International Conference on Computer Vision; 2019; p. 7708-7717.
Loper et al.; "OpenDR: An Approximate Differentiable Renderer"; European Conf. on Computer Vision; 2014; p. 154-169.
Mescheder et al.; "Occupancy Networks: Learning 3D Reconstruction in Function Space"; IEEE/CVF Conference on Computer Vision and Pattern Recognition; 2019; p. 4460-4470.
Mildenhall et al.; "NeRF: Representing Scenes as Neural Radiance Fields for View Synthesis"; European Conf. on Computer Vision; 2020; p. 405-421.
Nealen et al.; "Laplacian mesh optimization"; $4^{th}$ Int'l Conf. on Computer Graphics and Interactive Techniques in Australia and Southeast Asia; Nov. 2006; p. 381-389.
Niemeyer et al.; "GIRAFFE: Representing Scenes as Compositional Generative Neural Feature Fields": IEEE/CVF Conference on Computer Vision and Pattern Recognition; 2021; p. 11453-11464.
Niemeyer et al.; "Differentiable Volumetric Rendering: Learning Implicit 3D Representations Without 3D Supervision"; IEEE/CVF Conference on Computer Vision and Pattern Recognition; 2020; p. 3504-3515.
Ravi et al.; "Accelerating 3D Deep Learning with PyTorch3D"; Computer Vision and Pattern Recognition; arXiv:2007.08501; Jul. 2020; 18 pages.
Schwarz et al.; "GRAF: Generative Radiance Fields for 3D-Aware Image Synthesis"; Advances in Neural Information Processing Systems 33; 2020; 13 pages.
Wang et al.; "NeMo: Neural Mesh Models of Contrastive Features for Robust 3D Pose Estimation"; Computer Vision and Pattern Recognition; arXiv:2101.12378; Feb. 2021; 17 pages.
Wang et al.; "Neural View Synthesis and Matching for Semi-Supervised Few-Shot Learning of 3D Pose"; Advances in Neural Information Processing Systems 34; 2021; 13 pages.
Wang et al.; "Robust Object Detection Under Occlusion With Context-Aware CompositionalNets"; IEEE/CVF Conference on Computer Vision and Pattern Recognition; 2020; p. 12645-12654.
Westover; "Footprint evaluation for volume rendering"; $17^{th}$ Annual Conf. on Computer Graphics and Interactive Techniques; vol. 24; Aug. 1990; p. 367-376.
Xiang et al.; "ObjectNet3D: A Large Scale Database for 3D Object Recognition"; European Conf. on Computer Vision; 2016; p. 160-176.
Xiang et al.; "Beyond Pascal: A benchmark for 3D object detection in the wild"; IEEE Winter Conf. on Applications of Computer Vision; 2014; 8 pages.
Yifan et al.; "Differentiable surface splatting for point-based geometry processing"; ACM Transactions on Graphics; vol. 38; Dec. 2019; 14 pages.
Zhou et al.; "StarMap for Category-Agnostic Keypoint and Viewpoint Estimation"; European Conference on Computer Vision; 2018; p. 318-334.
Zwicker et al.; "EWA volume splatting"; Proceedings Visualization; Jul. 2001; 11 pages.
International Patent Application No. PCT/SG2023/050028; Int'l Search Report dated; Aug. 7, 2023; 3 pages.
C. Hofsetz; "Image-based rendering of range data with estimated depth uncertainty"; IEEE Computer Graphics and Applications; vol. 24; Jul./Aug. 2004; p. 34-41.
Zwicker et al.; "EWA splatting"; IEEE Transactions on Visualization and Computer Graphics; vol. 8; 2002; 10 pages.

\* cited by examiner

700

Reconstruct an object into a plurality of Gaussian ellipsoids, wherein the plurality of Gaussian ellipsoids correspond to a plurality of ellipsoidal Gaussian kernels, and each of the plurality of ellipsoidal Gaussian kernels is indicated by a density function 702

Sample a plurality of viewing rays for each of the plurality of Gaussian ellipsoids with a camera configuration 704

Determine a volume density of each of the plurality of Gaussian ellipsoids along each of the plurality of viewing rays 706

Compute occupancy along each of the plurality of viewing rays via volume density aggregation 708

Approximate the volume density aggregation based on determining a maximum value of the density function on each of the plurality of viewing rays 710

Reweight a contribution of each of the plurality of Gaussian ellipsoids 712

Synthesize an image of the object using determined weight on each pixel of the image to interpolate attributes of each of the plurality of Gaussian ellipsoids 714

FIG. 7

| Method | Rendering Mechanism | Representation | Component | Mutual Occlusion | Boundary |
|---|---|---|---|---|---|
| NMR [7] | rasterization | explicit | triangular mesh | none | hard |
| Soft Rasterizer [19] | rasterization | explicit | triangular mesh | artificial | soft |
| PyTorch3D [19] | rasterization | explicit | triangular mesh/points | artificial | soft/hard |
| DSS [27] | rasterization | explicit | Gaussian ellipse (2D) | artificial | soft |
| Pulsar [9] | rasterization | explicit | sphere | artificial | hard |
| 802 VoGE (ours) | ray aggregation* | explicit | Gaussian ellipsoid (3D) | natural | soft |
| NeRF [15] | ray aggregation* | implicit | — | natural | — |

FIG. 8

| Evaluation Metric | $ACC_{\frac{\pi}{6}}$ ↑ | | | | $ACC_{\frac{\pi}{18}}$ ↑ | | | | MedErr ↓ | | | |
|---|---|---|---|---|---|---|---|---|---|---|---|---|
| Occlusion Level | L0 | L1 | L2 | L3 | Avg. | L0 | L1 | L2 | L3 | Avg. | L0 | L1 | L2 | L3 | Avg. |
| Res50-General | 88.1 | 70.4 | 52.8 | 37.8 | 62.3 | 44.6 | 25.3 | 14.5 | 6.7 | 22.8 | 11.7 | 17.9 | 30.4 | 46.4 | 26.6 |
| Res50-Specific | 87.6 | 73.2 | 58.4 | 43.1 | 65.6 | 43.9 | 28.1 | 18.6 | 9.9 | 25.1 | 11.8 | 17.3 | 26.1 | 44.0 | 24.8 |
| StarMap | 89.4 | 71.1 | 47.2 | 22.9 | 59.5 | 57.7 | 34.4 | 13.9 | 3.7 | 27.9 | 9.0 | 17.6 | 34.1 | 63.0 | 30.9 |
| NeMo+SoftRas | 85.3 | 75.2 | 63.0 | 44.3 | 67.0 | 59.7 | 46.7 | 32.1 | 16.8 | 38.8 | 9.1 | 14.8 | 24.0 | 39.3 | 21.8 |
| NeMo+DSS | 81.1 | 71.9 | 56.8 | 38.7 | 62.1 | 33.5 | 30.4 | 23.0 | 14.1 | 25.3 | 16.1 | 19.8 | 25.8 | 40.4 | 25.5 |
| NeMo+PyTorch3D | 86.1 | 76.0 | 63.9 | 46.8 | 68.2 | 61.0 | 46.3 | 32.0 | 17.1 | 39.1 | 8.8 | 13.6 | 20.9 | 36.5 | 20.0 |
| NeMo+VoGE(Ours) | 90.1 | 83.1 | 72.5 | 56.0 | 75.4 | 69.2 | 56.1 | 41.5 | 24.8 | 47.9 | 6.9 | 9.9 | 15.0 | 26.3 | 14.5 |

| $ACC_{\frac{\pi}{6}}\uparrow$ | bed | bookshelf | calculator | cellphone | computer | cabinet | guitar | iron | knife |
|---|---|---|---|---|---|---|---|---|---|
| StarMap | 40.0 | 72.9 | 21.1 | 41.9 | 62.1 | 79.9 | 38.7 | 2.0 | 6.1 |
| NeMo+PyTorch3D | 56.1 | 53.7 | 57.1 | 28.2 | 78.8 | 83.6 | 38.8 | 32.3 | 9.8 |
| 1102 NeMo+VoGE(Ours) | 76.8 | 83.2 | 77.8 | 50.7 | 78.8 | 83.6 | 54.6 | 45.4 | 12.1 |

| $ACC_{\frac{\pi}{6}}\uparrow$ | microwave | pen | pot | rifle | slipper | stove | toilet | tub | wheelchair | Avg. |
|---|---|---|---|---|---|---|---|---|---|---|
| StarMap | 86.9 | 12.4 | 45.1 | 3.0 | 13.3 | 79.7 | 35.6 | 46.4 | 17.7 | 41.7 |
| NeMo+PyTorch3D | 90.3 | 3.7 | 66.7 | 13.7 | 6.1 | 85.2 | 74.5 | 61.6 | 71.7 | 52.9 |
| 1102 NeMo+VoGE(Ours) | 94.9 | 13.5 | 77.8 | 30.8 | 22.2 | 89.8 | 81.9 | 68.9 | 68.4 | 64.4 |

FIG. 11

| Exp. Setup | $ACC_{\frac{\pi}{6}}$ | $ACC_{\frac{\pi}{18}}$ | MedErr |
|---|---|---|---|
| $\zeta = 0.2$ | 89.9 | 68.7 | 7.0 |
| $\zeta = 0.5$ (standard) | 90.1 | 69.2 | 6.9 |
| $\zeta = 0.8$ | 90.3 | 64.7 | 8.5 |
| w/o grad $T(\mathbf{r})$ | 47.1 | 18.9 | 39.1 |
| w/o grad $\rho(\mathbf{r})$ | 31.7 | 8.0 | 48.1 |

FIG. 12

RENDERER USING EXPLICIT OBJECT REPRESENTION VIA RAYS TRACING VOLUME DENSITY AGGREGATION

BACKGROUND

The fields of computer vision and computer graphics deal with the acquisition, processing, analysis and rendering of visual information in different representations such as images, videos, three-dimensional models, and so on. Computer vision and computer graphics have many important applications in various areas. However, due to certain limitations, conventional rendering techniques may not fulfil needs for computer vision/graphics related tasks. Improvements in rendering techniques are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 illustrates another example process for implementing VoGE in accordance with the present disclosure.

FIG. 8 illustrates comparisons between VoGE and other rendering techniques.

FIG. 9 illustrates significant performance improvements by using VoGE on object pose estimation compared to other techniques.

FIG. 11 illustrates significant performance improvements by using VoGE on object pose estimation compared to other techniques.

FIG. 12 illustrates an ablation study for object pose estimation.

DETAILED DESCRIPTION OF ILLUSTRATIVE EMBODIMENTS

Figure 1:
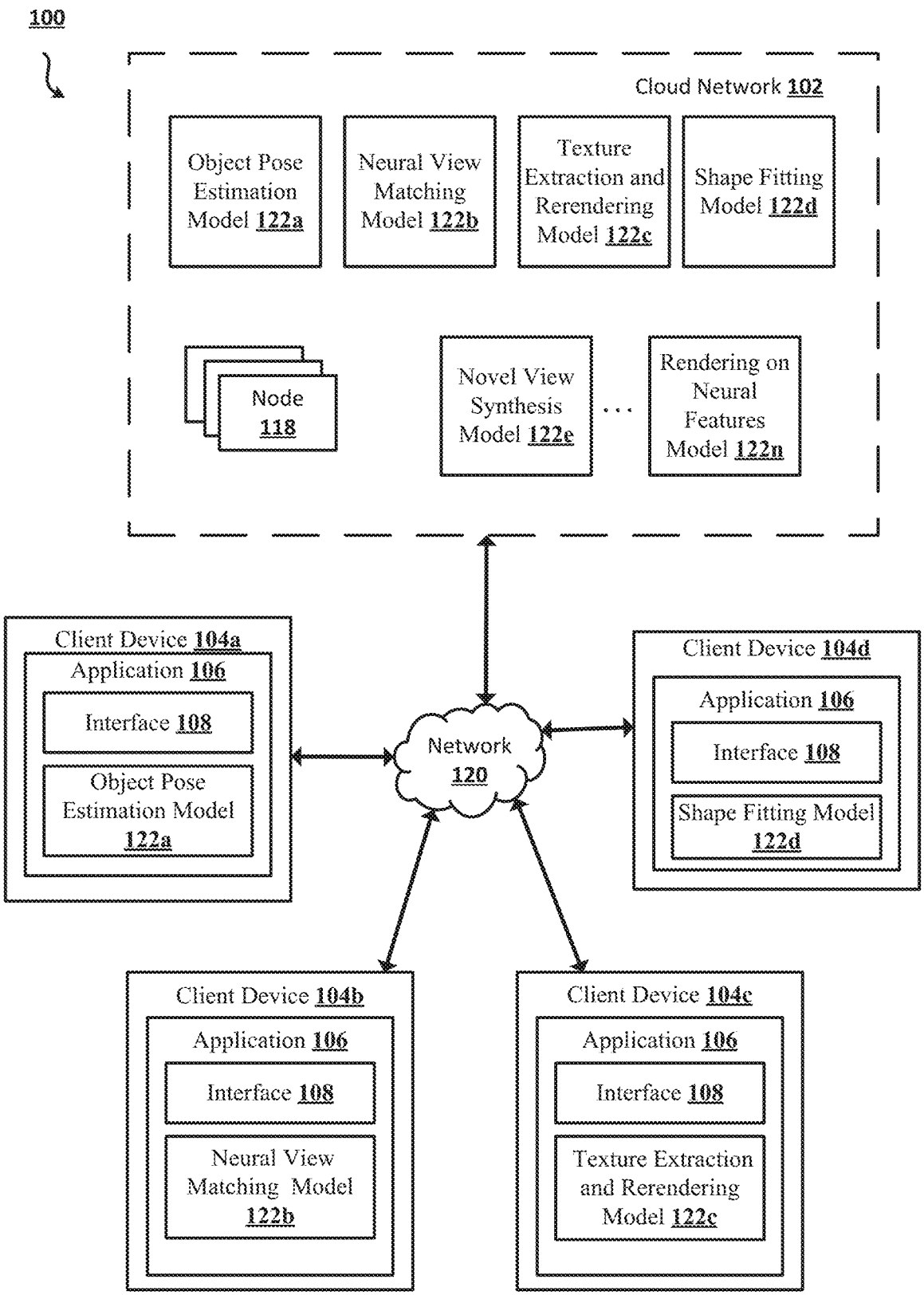
FIG. 1 illustrates an example system which may utilize a differentiable volume renderer using neural Gaussian Ellipsoids (VoGE) in accordance with the present disclosure.

Recently, volume rendering approaches demonstrate impressive results on tasks such as novel view synthesis and image generation. Volume rendering simulates a physical process of light interacting with matter. A volume renderer aggregates the volume density via tracing rays and synthesizing images similar to optics in the real world. Such processes produce images with high-quality details and realistic occlusions among different objects. However, current volume rendering approaches are limited by the adequacy of interpretability of such objects and can be difficult to control with human inputs.

On the other hand, generic renderers utilize explicit object geometry, i.e., triangular meshes, ellipse disk, which demonstrates high interpretability with modifiability. Besides, these approaches give significantly faster rendering speed in comparison with volume rendering approaches. However, differentiating such process is a potential challenge. Specifically, there are two major issues: (1) hard boundaries of components (triangles) block the gradient, and (2) absence of gradient toward invisible components. Currently, there are multiple approaches to resolving the first issue, e.g., using approximate gradients, and softening the boundaries of the components. The second issue remains open. Existing approaches have proposed an artificial approximation using weights determined by distance to blend multiple observed components. However, such approximation does not match the optical property in the real world and is sensitive to manually tuned parameters known as the near and far boundary.

The present disclosure provides a differentiable volume renderer using neural Gaussian Ellipsoids (VoGE). VoGE combines the advantages of both volume and generic renderer by representing objects using explicit object geometries and rendering via ray tracing volume density aggregation. VoGE is a differentiable volume renderer using explicit object representations. Similar to other explicit object representations (e.g., meshes) that decompose objects into components, VoGE may use a variety of different fundamental techniques involving volume Gaussian ellipsoids to reconstruct objects.

The explicit representation of object geometry gives VoGE excellent interpretability and modifiability. Exceptional representation ability allows transferring common three-dimensional (3D) object representations (e.g., meshes, and point clouds) into Gaussian ellipsoids. On the other hand, VoGE may render using volume rendering formulation, which simulates the observation of a 3D scene based on optical rules in the real world. VoGE may conduct aggregation of volume density along the viewing rays, which naturally resolve the mutual occlusion of each component with full differentiability.

The present disclosure further provides an approximate closed-form solution for approximating volume density aggregation, which allows VoGE to conduct volume rendering in a computationally efficient way. The volume density aggregation may be approximated based on determining a maximum value of the density function of each Gaussian kernel along each viewing ray. The approximate closed-form solution may compute the density aggregation without computational heavy operations, and this solution may conduct the computation in an accurate and effective way.

VoGE may perform various tasks, such as object pose estimation, matching, texture extraction, shape fitting, and so on. VoGE shows exceptional performance on different tasks, e.g., novel view synthesis from a single image, and rendering on neural features of images. Quantitative results demonstrate that VoGE significantly outperforms concurrent state-of-the-art differentiable renderers on in-wild object pose estimation tasks.

VoGE as described in the present disclosure may be utilized by and/or integrated into a variety of different systems. FIG. 1 illustrates an example system 100 into which the rendering techniques in accordance with the present disclosure may be integrated. The system 100 may comprise a cloud network 102 or a server computing device and a plurality of client computing devices 104a-d. The cloud network 102 and the plurality of client computing devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like. In an embodiment, a user may use an application 106 on a client device 104, such as to interact with the cloud network 102. The client computing devices 104 may access an interface 108 of the application 106.

The plurality of computing nodes 118 may process tasks associated with the cloud network 102. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In some embodiments, at least one of the cloud network 102 or the client computing devices 104 comprise one or more models for performing computer vision/graphics related tasks, such as an object pose estimation model 122a, a neural view matching model 122b, a texture extraction and re-rendering model 122c, a shape fitting model 122d, a novel view synthesis model 122e, a rendering on neural features of images model 122n, and/or any other models. VoGE may have been utilized by or integrated into these various models. For example, VoGE may have been utilized to serve as a sampler and/or a renderer for the object pose estimation model 122a, the neural view matching model 122b, the texture extraction and re-rendering model 122c, the shape fitting model 122d, the novel view synthesis model 122e, the rendering on neural features of images model 122n, and any other models.

Figure 2A:
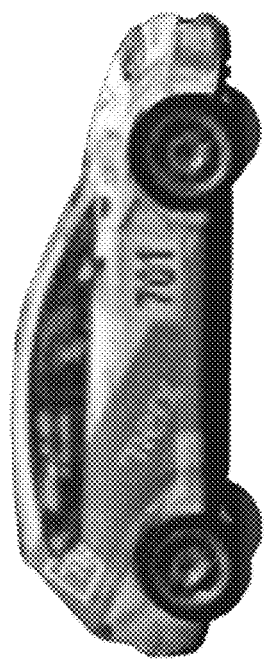
FIG. 2A-2D illustrate example tasks utilizing VoGE in accordance with the present disclosure.
Figure 2B:
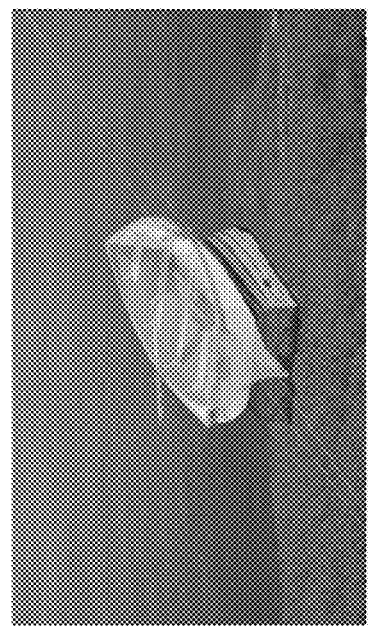

VoGE may be utilized to perform various tasks. In some examples, VoGE may utilize existing 3D object models and serve as a renderer. Triangular meshes or point clouds of existing 3D object models may be converted into Gaussian ellipsoids. VoGE may utilize the Gaussian ellipsoids for rendering. FIG. 2A illustrates example rendered surface normal with converted Stanford Bunny mesh. In another example, the point cloud in PyTorch3D official demo may be converted and then rendered using VoGE, as shown in FIG. 2B.

Figure 2C:
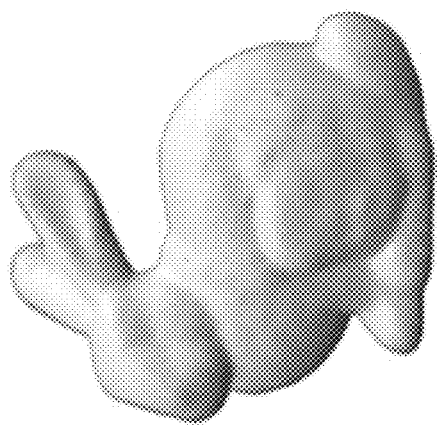
Figure 2D:

In other examples, VoGE may serve as a feature or texture sampler. For instance, VoGE may sample feature/texture via fitting their spatial distribution, while rendering the sampled feature/texture in the same distribution. For example, VoGE may sample textures from an in-wild car image and re-rendered under a novel pose as shown in FIG. 2C. In another example as shown in FIG. 2D, VoGE may perform on in-wild object pose estimation by serving as the feature sampler and renderer in a neural feature level render-and-compare object pose estimation pipeline. Extensive experiments also show that VoGE may obtain exceptional performance when applies on other tasks, e.g., matching, multi-view shape fitting, etc.

Figure 3:
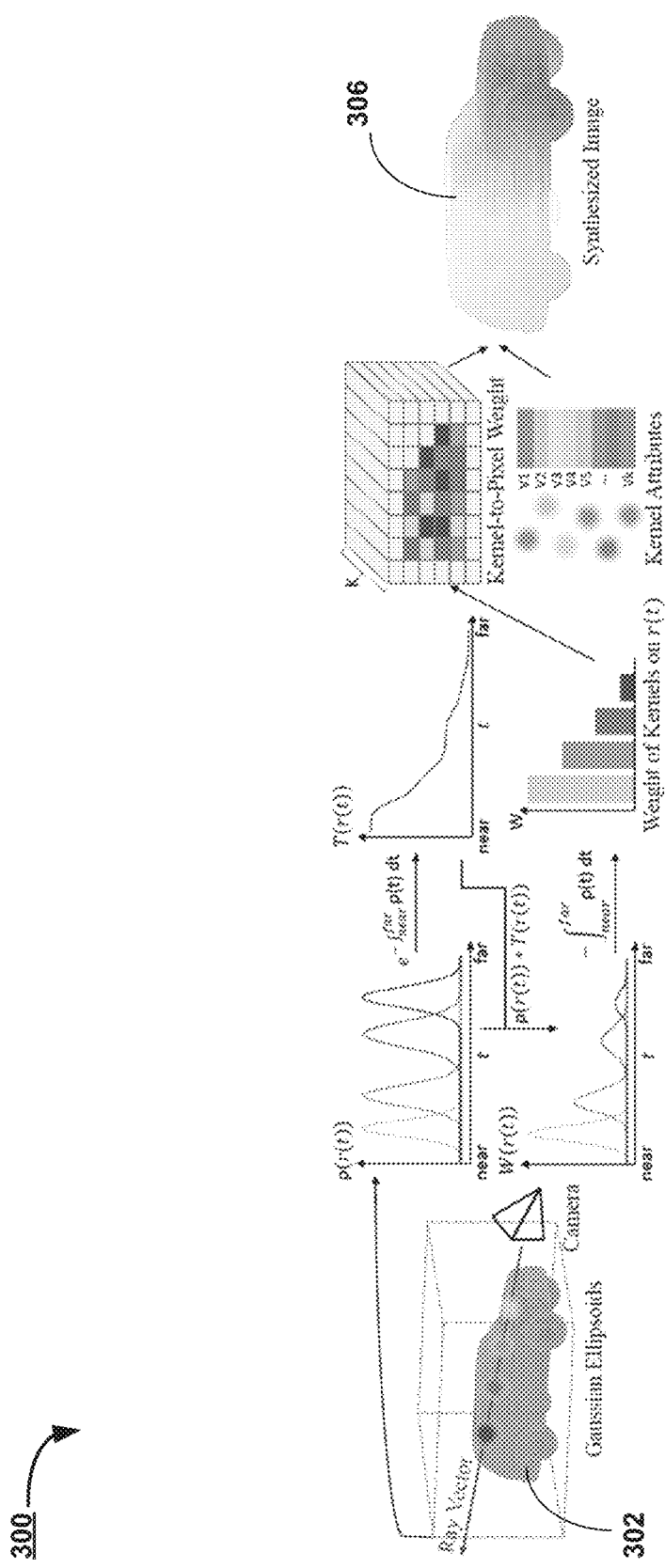
FIG. 3 illustrates an example rendering pipeline of VoGE in accordance with the present disclosure.

FIG. 3 illustrates an example rendering pipeline of VoGE. VoGE may represent an object using explicit object geometries. For example, VoGE may use Gaussian ellipsoids to reconstruct the object (e.g., a car) 302 in a 3D space. In one example, the object 302 may be reconstructed using a set of anisotropic 3D Gaussian reconstruction kernels for computational efficiency. Each Gaussian kernel may be described with a density function.

VoGE represents the object 302 using explicit object geometries (e.g., Gaussian ellipsoids), while renders via the rays tracing volume density aggregation. During rendering, given the Gaussian ellipsoids, e.g., the set of anisotropic 3D Gaussian reconstruction kernels, VoGE may first sample viewing rays r(t) with a camera configuration. Then for each ray, the volume density may be formulated as a function of location along the ray with respect to each ellipsoid.

Along each ray, VoGE may compute the density of each ellipsoid $\rho_k(r(t))$, respectively. Occupancy along each ray may be computed via an integral of the volume density, and the contribution of each ellipsoid may be reweighted. The occupancy T(r(t)) may be accumulated via density aggregation along the ray. The observation of each Gaussian ellipsoid kernels $W_k$ may be computed via integral of reweighted per-kernel volume density $W_k(r(t))$. VoGE may synthesize an image 306 of the object 302 using the computed weight $W_k$ on each pixel of the image to interpolate attributes of each Gaussian ellipsoid (e.g., each reconstruction kernel).

The occupancy T(r(t)) along each ray may be accumulated via volume density aggregation, which requires computational heavy operations. The present disclosure provides an approximate closed-form solution for the volume density aggregation using Gaussian kernels. The occupancy along each ray may be approximated based on determining a maximum value of the density function of each Gaussian kernel on the ray. This approximate closed-form solution enables to compute the density aggregation without computational heavy operations. The approximate closed-form solution can conduct the computation in an accurate and effective way.

In volume rendering, objects (e.g., the object 302) are represented using contiguous volume density functions. Specifically, for each point in the volume, a corresponding density $\rho(x, y, z)$ with emitted color $c(x, y, z)=(r, g, b)$ may be found, where $(x, y, z)$ denotes the location of a point in a 3D space. During the volume rendering process, light scattering equation for volume density provides a mechanism to compute the observed color $C(r)$ along a ray $r(t)=(x(t), y(t), z(t))$:

$$C(r) = \int_{t_n}^{t_f} T(t)\rho(r(t))dt, \tag{1}$$

where $T(t)=\exp(-\tau \int_{t_n}^{t} \rho(r(s))ds)$ wherein $\tau$ represents a coefficient that determines the rate of absorption, $t_n$ represents the near bound along the ray, and $t_f$ represents the far bound along the ray.

Kernel reconstruction may be used to conduct volume rendering in a computationally efficient way due to the difficulty of obtaining contiguous function of the volume density and enormous computation cost when calculating the integral. The reconstruction decomposes the contiguous volume into a set of homogeneous kernels, while each kernel can be described with a simple density function. In some examples, volume ellipsoidal Gaussians may be used as the reconstruction kernels. Specifically, the volume is reconstructed with a sum of ellipsoidal Gaussians:

$$\rho(X) = \sum_{k=1}^{K} \frac{1}{\sqrt{2\pi \cdot \|\Sigma_k\|_2}} e^{-\frac{1}{2}(X-M_k)^T \cdot \Sigma_k^{-1} \cdot (X-M_k)} \tag{2}$$

Wherein $\rho(X)$ represents a density at a location X, and $X=(x, y, z)$ represents an arbitrary location in the 3D space. K represents a total number of ellipsoidal Gaussian kernels. $M_k$, a 3×1 vector, represents a center of a k-th ellipsoidal Gaussian kernel. The centers of the ellipsoidal Gaussian kernels may be named as vertices since they have similar properties as the vertices in surface meshes. $\Sigma_k$, a 3×3 spatial variance matrix, controls the direction, size and shape of the k-th kernel. Also, the emitted color may be assumed approximately constant inside each reconstruction kernel $c(r(t))=c_k$.

Figure 4:
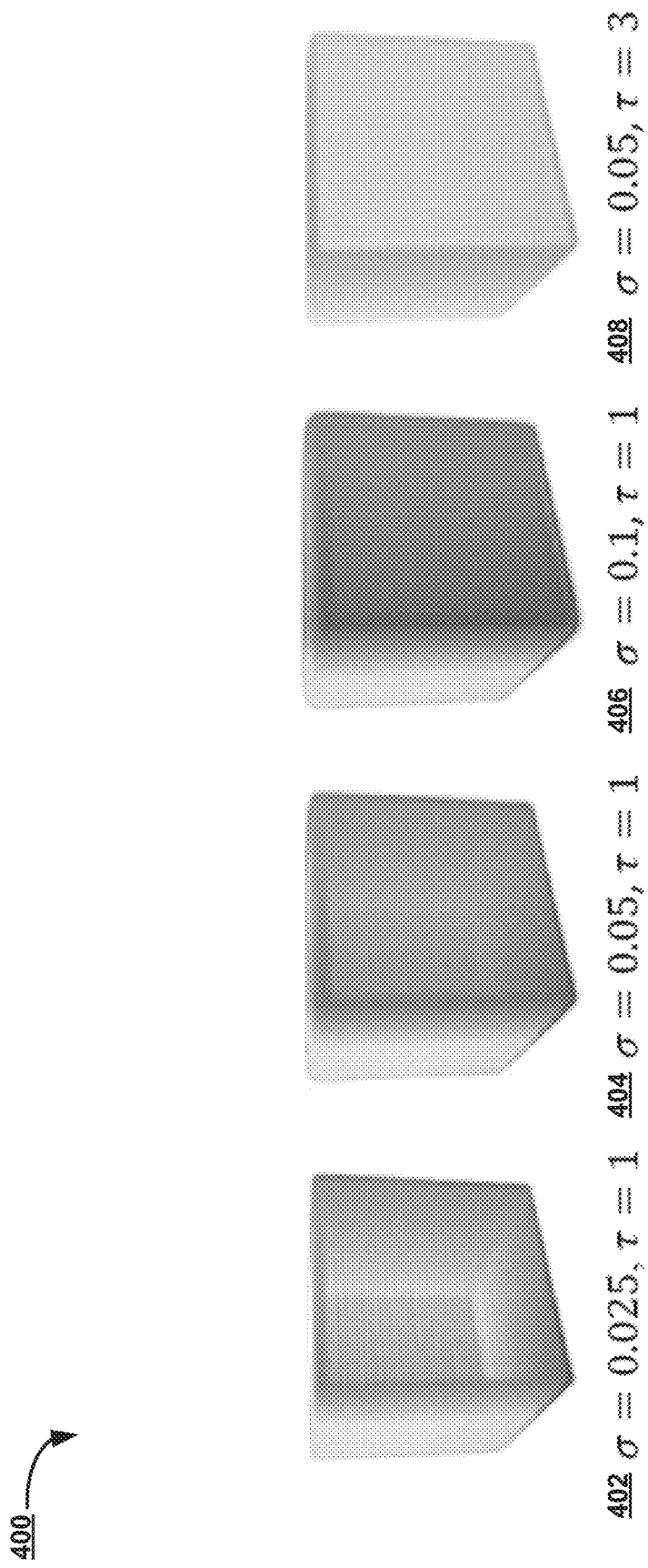
FIG. 4 illustrates an example of rendering cuboid using VoGE in accordance with the present disclosure.

FIG. 4 illustrates an example of rendering a cuboid using VoGE under different $\Sigma$ and $\tau$. In this example, $\Sigma_k$ is set to be a diagonal matrix filled with the same value $\sigma$, which makes all kernels the same and isotropic. 402-406 demonstrate the difference in rendering the cuboid when increasing $\sigma$, while the rate of absorption $\tau$ remains stagnant at 1. 408 illustrates a rendered cuboid where $\sigma$ remains at 0.05, but the rate of absorption $\tau$ is increased from 1 to 3.

The anisotropic Gaussian ellipsoid kernels may reconstruct any arbitrary 3D shapes, which allows to convert common representations (e.g., meshes and point clouds) into Gaussian ellipsoids. For example, when converting meshes to Gaussian ellipsoids, $\Sigma_k$ may be computed based on the distance from k-th vertex to its neighbors. In another example, point clouds may be easily converted via homogeneous isotropic Gaussians.

Viewing transformation may be conducted to transfer the re-constructed kernels from object coordinate to camera coordinate. Vertices in the object coordinate may be denoted by $M_k^o$. The vertices in the camera coordinate may be computed using:

$$M_k = R \cdot M_k^o + T \tag{3}$$

Wherein, R represents rotation matrix from the object coordinate to the camera coordinate, and T represents translation matrix from the object coordinate to the camera coordinate. Since 3D Gaussian Kernels are ellipsoidal, observations of the variance matrices may also be changed upon camera rotations:

$$\Sigma_k^{-1} = R^T \cdot (\Sigma_k^o)^{-1} \cdot R \tag{4}$$

wherein $R^T$ represents the transposed matrix of R. $M_k$ and $\Sigma_k$ may then be rendered into a color image by computing a kernel-to-pixel weight W:

$$C(p) = \sum_{k=1}^{K} W_{p,k} \cdot c_k \tag{5}$$

Figure 5:
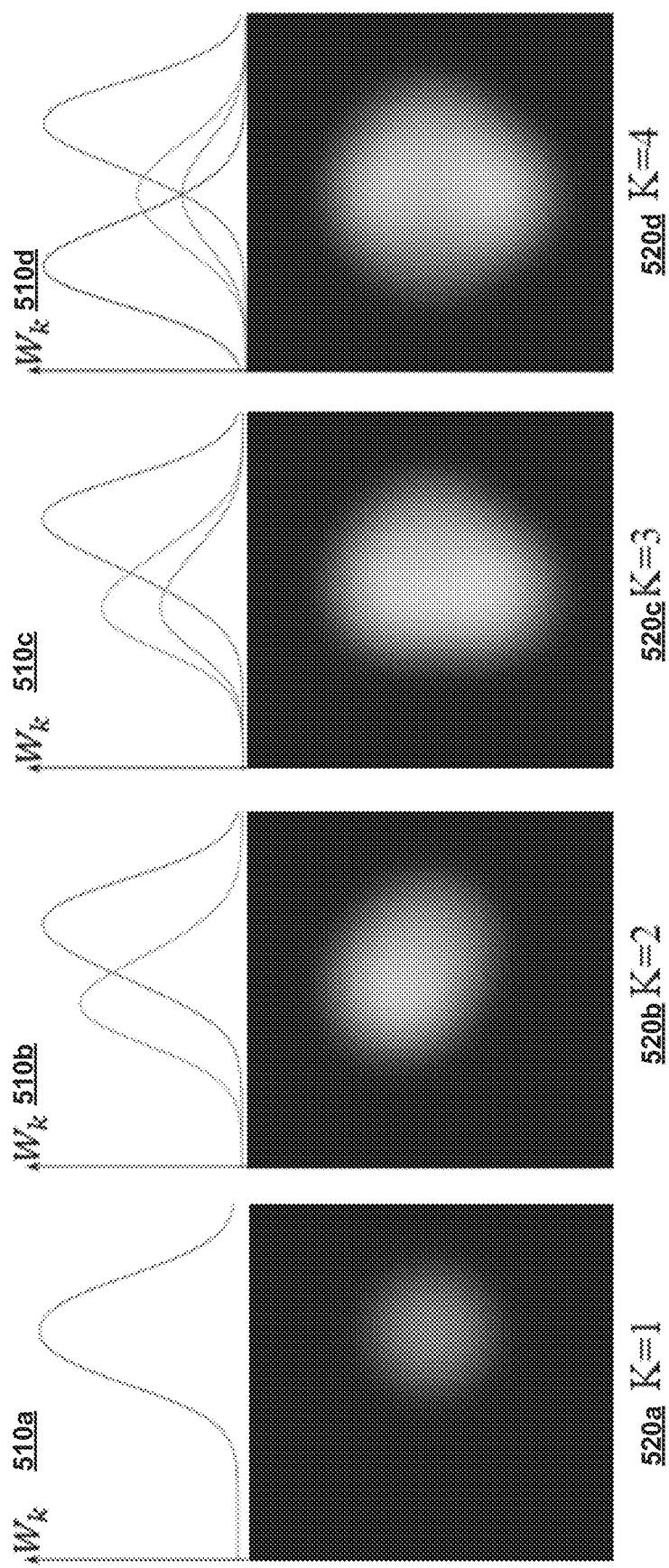
FIG. 5 illustrates an example of rendering with an increasing number of Gaussian ellipsoids in accordance with the present disclosure.

FIG. 5 illustrates an example of rendering with an increasing number of Gaussian ellipsoids. 510a-510d illustrate kernel-to-pixel weights along the median row on the image, and each weight curve corresponds to a Gaussian ellipsoid. A number of Gaussian ellipsoids in each of the rendered RGB images 520a-520d is represented by K. The number of Gaussian ellipsoids in the images 520a-520d increases from one to four.

Perspective rays indicate the viewing direction in the camera coordinate. For each pixel, the rays may be computed under the assumption that the camera is fully perspective:

$$r(t) = D * t = \left[ \frac{i - O_y}{F} \quad \frac{j - O_x}{F} \quad 1 \right]^T * t \tag{6}$$

Wherein $p=(i, j)$ represents the pixel location on the image, and $O_x$, $O_y$ represent the principal point of the camera, F represents the focal length, D represents the ray direction vector. The observation along the ray r may be computed by ray tracing volume density aggregation. But computing an integral using brute force is so computational inefficient that it is infeasible for concurrent computation power. To resolve this, the present disclosure provides an approximate closed-form solution, which can conduct the computation in an accurate and effective way.

The Gaussian ellipsoid reconstruction kernel has a useful propriety that each observation along the ray gives a 1D Gaussian density function, and thus it is feasible to compute the integral by determining the maximum value of the density function on the ray. The integral of the Gaussian function may be closed-form computable with erf, the Error Function, which may be implemented in common computation platforms. Specifically, with Equation 2, and Equation 6, T(t) may be calculated as:

$$T(t) = \exp\left(-\tau \int_{-\infty}^{t} \rho(r(s))ds\right) = \exp\left(-\tau \sum_{m=1}^{K} e^{-\frac{1}{2}V_m^T \Sigma_m^{-1} V_m} \frac{\text{erf}\left((t - l_m)\sqrt{D^T \cdot \Sigma_m^{-1} \cdot D}\right) + 1}{2}\right) \tag{7}$$

where $$l_m = \frac{M_m^T \cdot \sum_m^{-1} \cdot D + D^T \cdot \sum_m^{-1} \cdot M_m}{2 \cdot D^t \cdot \Sigma_m^{-1} \cdot D}$$

represents the length along the ray that gives peak activation for a m-th kernel, and the vector $V_m = M_m - l_m \cdot D$, that exp $$\left( -\frac{1}{2} V_m^T \cdot \Sigma_k^{-1} \cdot V_m \right)$$

computes the peak density of the m-th kernel along the ray.

The closed-form solution of the outer integral in Equation 1 may be computed, for each Gaussian ellipsoid, by using the T (t), $t=l_k$ at the peak of $\rho(r(t))$ along the rays. The closed-form solution for C(r) is provided as follows:

$$C(r) = \int_{-\infty}^{\infty} T(t)\rho(r(t))c(r(t))dt = \sum_{k=1}^{K} T(l_k) e^{-\frac{1}{2} V_k^T \cdot \Sigma_k^{-1} \cdot V_k} c_k \quad (8)$$

It may be equivalent to set $t_n = -\infty$ and $t_f = \infty$ based on the assumption that the distance from the camera to vertices is significantly larger than the kernel size. In order to further reduce computational cost, for each ray, only a subset K'<<K of Gaussian ellipsoids that gives non-trivial contribution on the final C(r) may be considered.

VoGE can be easily embedded into neural networks by serving as neural sampler and renderer. As a sampler, VoGE may extract attributes $\alpha_k$ (e.g., deep neural features, textures) from images or feature maps into kernel-correspond attributes, which may be conducted via reconstructing their spatial distribution in the screen coordinates. When serving as a renderer, VoGE may convert kernel-correspond attributes into images or feature maps. Since both sampling and rendering give the same spatial distribution of feature/texture, it is possible for VoGE to conduct geometry-based image-to-image transformation (or feature-to-feature).

VoGE may sample deep neural features. In an example, $\Phi$ denotes observed features, and $\phi(p)$ represents the value of the observed features at a location p. During sampling, the per kernel attribute may be represented by $A = \cup_{k=1}^{K} \{\alpha_k\}$, a given object geometry may be represented by $T = \cup_{k=1}^{K} \{M_k, \Sigma_k\}$, and the viewing rays may be represented by r(p). The synthesis of the observation may be expressed via the conditional probability regarding the attributes $\alpha_k$:

$$\phi'(p) = \sum_{k=1}^{K} P(\alpha_k | \Gamma, r(p), k) \alpha_k \quad (9)$$

Since $\Phi$ is a discrete observation of a continuous distribution $\phi(p)$ on the screen, the synthetization can only be evaluated at discrete positions, i.e., the pixel centers. An inverse reconstruction may make $\Phi'$ similar as $\Phi$ on all observable locations:

$$\alpha_k = \sum_{k=1}^{K} P(\phi(p) | \Gamma, r(p), p) \phi(p) = \frac{\sum_{p=1}^{P} W_{p,k} * \phi_p}{\sum_{p=1}^{P} W_{p,k}} \quad (10)$$

where $$W_{p,k} = T(l_k) e^{-\frac{1}{2} V_k^T \Sigma_k^{-1} V_k}$$

represents the kernel-to-pixel weight. Both sampling and rendering may be conducted in a forward manner via matrix multiplication. In another embodiment, anisotropic Gaussian ellipsoids may give better shape representation ability with higher efficiency. This gain may be obtained via elegant mesh converters or by creating object models natively with Gaussian ellipsoids.

Figure 6:
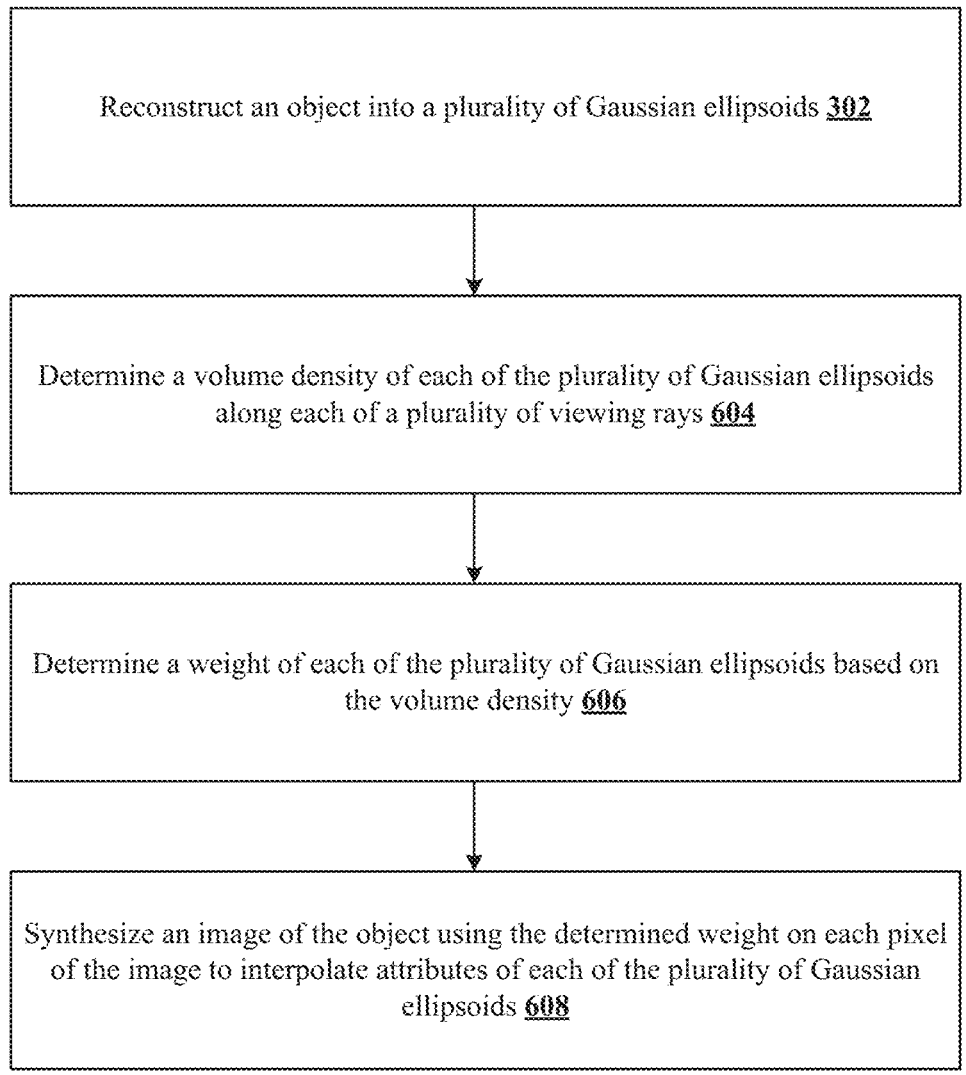
FIG. 6 illustrates an example process for implementing VoGE in accordance with the present disclosure.

FIG. 6 illustrates an example process 600 implementing VoGE. The example process may be performed by any models utilizing VoGE, e.g., the object pose estimation model 122a, the neural view matching model 122b, the texture extraction and re-rendering model 122c, the shape fitting model 122d, the novel view synthesis model 122e, the rendering on neural features of images model 122n as shown in FIG. 1. Although depicted as a sequence of operations in FIG. 6, those of ordinary skill in the art will appreciate that various embodiments may add, remove, reorder, or modify the depicted operations.

At 602, an object may be reconstructed into a plurality of Gaussian ellipsoids. The object may have any 3D shapes. Gaussian ellipsoids may reconstruct any arbitrary 3D shapes. In some embodiments, existing 3D object models may be utilized by converting triangular meshes or point clouds into a plurality of Gaussian ellipsoids. In other embodiments, an object with any 3D shape may be reconstructed into a plurality of Gaussian ellipsoids by sampling features/textures via fitting their spatial distribution. Each of the Gaussian ellipsoid may be indicated with a center location and a spatial variance that controls the direction, size and shape of each Gaussian ellipsoid.

In one example, kernel reconstruction may be used for the purpose of computational efficiency. An object may be reconstructed into a plurality of ellipsoidal Gaussian kernels. The reconstruction decomposes the contiguous volume into a set of homogeneous kernels, and each kernel can be described with a simple density function. In another example, attributes (e.g., deep neural features, textures) may be extracted from images or feature maps into kernel-correspond attributes, which may be conducted via reconstructing their spatial distribution in screen coordinates.

At 604, a volume density of each of the plurality of Gaussian ellipsoids along each of a plurality of viewing rays may be determined. During rendering, given the plurality of Gaussian ellipsoids, a plurality of viewing rays may be sampled with a camera configuration. For each ray, a volume density may be formulated as a function of location along the ray with respect to each of the plurality of Gaussian ellipsoids. For each point in the volume, there may be a corresponding density with emitted color based on a location of the point in a 3D space. Along each ray, the volume density of each of the plurality of Gaussian ellipsoids may be determined based on the density function.

In some embodiments, kernel reconstruction may be used to conduct volume rendering in a computationally efficient way. The reconstruction decomposes the contiguous volume into a set of homogeneous kernels. Each kernel can be described with a simple density function. In one example, volume ellipsoidal Gaussians may be used as the reconstruction kernels. For instance, the volume may be reconstructed with a sum of ellipsoidal Gaussian kernels:

$$\rho(X) = \sum_{k=1}^{K} \frac{1}{\sqrt{2\pi \cdot \|\Sigma_k\|_2}} e^{-\frac{1}{2}(X-M_k)^T \cdot \Sigma_k^{-1} \cdot (X-M_k)}$$

wherein ρ(X) represents a density at a location X in a 3D space, K represents a total number of ellipsoidal Gaussian kernels, $M_k$ represents a center of k-th ellipsoidal Gaussian kernel, and $\Sigma_k$ represents a spatial variance matrix indicative of direction, size and shape of the k-th ellipsoidal Gaussian kernel.

At 606, a weight of each of the plurality of Gaussian ellipsoids may be determined based on the volume density. Volume rendering conducts aggregation of volume density along each of the plurality of viewing rays, which naturally resolves mutual occlusion in a contiguous way. Occupancy along each of the plurality of viewing rays may be computed via an integral of the volume density of each of the plurality of Gaussian ellipsoids. The contribution of each of the plurality of Gaussian ellipsoids may be reweighted. In some embodiments, the observation of each of the plurality of ellipsoidal Gaussian kernels may be computed via integral of reweighted per-kernel volume density.

At 608, an image of the object may be synthesized using the computed weight on each pixel of the image to interpolate the attributes of each of the plurality of Gaussian ellipsoids. Each of the plurality of Gaussian ellipsoids may be rendered into a color image based on computing kernel-to-pixel weights. The attributes of each ellipsoidal Gaussian kernel with the kernel-to-pixel weights may be interpolated into the image.

FIG. 7 illustrates an example process 700 implementing VoGE. The example process may be performed by any models utilizing VoGE, e.g., the object pose estimation model 122a, the neural view matching model 122b, the texture extraction and re-rendering model 122c, the shape fitting model 122d, the novel view synthesis model 122e, the rendering on neural features of images model 122n as shown in FIG. 1. Although depicted as a sequence of operations in FIG. 7, those of ordinary skill in the art will appreciate that various embodiments may add, remove, reorder, or modify the depicted operations.

At 702, an object may be reconstructed into a plurality of Gaussian ellipsoids. The plurality of Gaussian ellipsoid may correspond to a plurality of ellipsoidal Gaussian kernels. Each of the plurality of ellipsoidal Gaussian kernels may be indicated by a density function. The Gaussian ellipsoids (i.e., ellipsoidal Gaussian kernels) may reconstruct any arbitrary 3D shapes.

In some examples, existing 3D object models may be utilized by converting triangular meshes or point clouds into a plurality of Gaussian ellipsoids. In other examples, an object with any 3D shape may be reconstructed into a plurality of Gaussian ellipsoids by sampling features/textures via fitting their spatial distribution. Kernel reconstruction may be used for computational efficiency. The kernel reconstruction decomposes the contiguous volume into a plurality of homogeneous kernels, and each kernel can be described with a simple density function. Volume ellipsoidal Gaussians may be used as the reconstruction kernels. In some embodiments, attributes (e.g., deep neural features, textures) may be extracted from images or feature maps into kernel-correspond attributes, which may be conducted via reconstructing their spatial distribution in screen coordinates.

At 704, a plurality of viewing rays may be sampled for each of the plurality of Gaussian ellipsoids (i.e., the plurality of ellipsoidal Gaussian kernels) with a camera configuration. For each ray, a volume density may be formulated as a function of location along the ray with respect to each of the plurality of ellipsoidal Gaussian kernels. For each point in the volume, there is a corresponding density with emitted color based on a location of the point in a 3D space. At 706, a volume density of each of the plurality of ellipsoidal Gaussian kernels on each of the plurality of viewing rays may be determined based on the density function.

At 708, the occupancy along each of the plurality of viewing rays may be computed via volume density aggregation. Volume rendering conducts aggregation of volume density along each of the plurality of viewing rays. Occupancy along each of the plurality of viewing ray may be computed via an integral of the volume density of each of the plurality of Gaussian ellipsoids (i.e., the plurality of ellipsoidal Gaussian kernels). The occupancy along each viewing ray may be accumulated via volume density aggregation.

At 710, the volume density aggregation may be approximated based on determining a maximum value of the density function on each of the plurality of viewing rays. The occupancy along each viewing ray may be accumulated via volume density aggregation, which requires computational heavy operations. The present disclosure provides an approximate closed-form solution. The Gaussian ellipsoid reconstruction kernel has a useful propriety that each observation along the ray gives a 1D Gaussian density function, and thus it is feasible to compute an integral based on determining a maximum value of the density function on the ray. The occupancy along each of the plurality of viewing rays may be approximated based on determining a maximum value of the density function on the ray. The approximate closed-form solution allows to compute the density aggregation without computational heavy operations. This approximate closed-form solution may conduct the computation in an accurate and effective way.

At 712, each of the plurality of Gaussian ellipsoids (i.e., ellipsoidal Gaussian kernels) may be reweighed. In some examples, the observation of each ellipsoidal Gaussian kernel may be computed using the approximate closed-form solution as described in the present disclosure. The contribution of each of the plurality of Gaussian ellipsoids (i.e., the plurality of ellipsoidal Gaussian kernels) may be reweighted. At 714, an image may be synthesized using the computed weight on each pixel of the image to interpolate the attributes of each of the plurality of Gaussian ellipsoids (i.e., the plurality of ellipsoidal Gaussian kernels). Each of the plurality of the plurality of Gaussian ellipsoids (i.e., the plurality of ellipsoidal Gaussian kernels) may be rendered into a color image based on computing kernel-to-pixel weights. The attributes of each ellipsoidal Gaussian kernel with the kernel-to-pixel weights may be interpolated into the image.

As illustrated in FIG. 8, different from other generic differentiable renderers, VoGE uses explicit object representations, while renders with ray tracing density aggregation that resolves mutual occlusion naturally with full differentiability. VoGE combines the advantages of both volume and generic renderers, which enables VoGE to excel on various tasks, e.g., object pose Estimation, neural view matching, texture extraction and rendering, and shape sitting.

VoGE may serves as a feature sampler and renderer for object pose estimation. The pipeline proposed by NeMo may be utilized, and NeMo is an in-wild category-level object 3D pose estimator that conducts render-and-compare on neural feature level. NeMo utilizes PyTorch3D as the feature sampler and renderer, where the former converts the feature maps to vertex corresponded feature vectors and the latter conducts the inverse process. VoGE may be embedded into neural networks to replace the PyTorch3D sampler and renderer.

The pose estimation performance may be evaluated on the PASCAL3D+ dataset, the Occluded PASCAL3D+ dataset and/or the Ob-jectNet3D dataset. The PASCAL3D+ dataset contains objects in 12 man-made categories with 11045 training images and 10812 testing images. The Occluded PASCAL3D+ contains the occluded version of same images, which may be obtained via superimposing occluder cropped from the MS-COCO dataset. The dataset includes three levels of occlusion with increasing occlusion rates.

The pose estimation performance may be measured via accuracy of rotation error under given thresholds and median of per image rotation errors. The rotation error may be defined as the difference between the predicted rotation matrix and the ground truth rotation matrix:

$$\Delta(R_{pred}, R_{gt}) = \frac{\left\|\log m(R_{pred}^R R_{gt})\right\|_F}{\sqrt{2}}.$$

VoGE may be compared for object pose estimation with other state-of-the-art differentiable rendering methods, i.e. Soft Rasterizer, DSS, and PyTorch3D. For comparison, the same training and inference pipeline and hyper-parameter may be used. For a baseline, Res50-General/Specific, which converts object pose estimation into a bin classification problem, and StarMap, which first detect key points, may be used. Additionally, the object pose estimation may be conducted via the PnP method.

Following the setup in NeMo, the feature extractor may train 800 epochs with a progressive learning rate. In the inference stage, for each image, 144 starting poses and optimizer 300 steps are sampled via an ADAM optimizer. Then the meshes provided by NeMo may be converted using the Gaussian ellipsoid kernel reconstruction method described previously. Currently, with the full PyTorch implementation, the run time may be slower than the original NeMo. However, the run time could be significantly improved using a CUDA implementation as PyTorch3D does.

FIG. 9 illustrates the pose estimation results on PASCAL3D+ and the Occluded PASCAL3D+ dataset. Occlusion level L0 represents the original images from PASCAL3D+, while Occlusion Level L1 to L3 may represent the occluded PASCAL3D+ images with increasing occlusion ratio. The object pose estimation performance is compared among different renderers, i.e., VoGE, Soft Rasterizer, DSS, PyTorch3D (which is used in NeMo originally). The results in FIG. 9 show significant performance improvements by using VoGE as a renderer and sampler compared to Soft Rasterizer, DSS and PyTorch3D.

Figure 10:
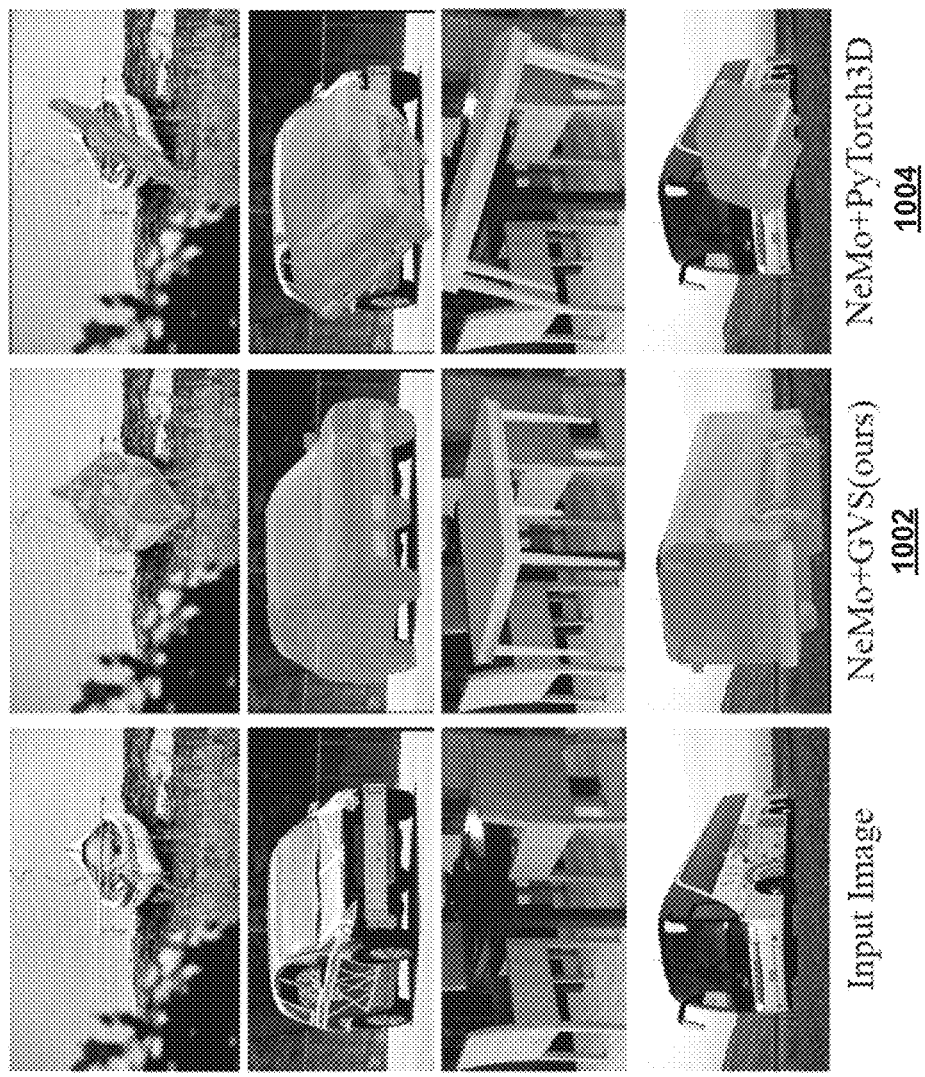
FIG. 10 illustrates improved qualitative results using VoGE on object pose estimation compared to other techniques.

FIG. 10 illustrates qualitative object pose estimation results on the PASCAL3D+ dataset. The predicted object poses from NeMo with VoGE (i.e., NeMo+GVS) 1002 and the predicted object poses from standard NeMo (i.e., NeMo+ PyTorch3D) 1004 are visualized as shown in FIG. 10. The predicted object poses from the NeMo utilizing VoGE 1002 show significantly improved qualitative pose estimation results compared to the predicted object poses from standard NeMo 1004. Both qualitative and quantitative results demonstrate that VoGE significantly outperforms other concurrent render on in-wild object pose estimation tasks.

FIG. 11 illustrates pose estimation results on ObjectNet3D evaluated via pose estimation accuracy percentage for error under π/6 (the higher the better). NeMo+ VoGE approach 1102 demonstrates a significant performance gain compared to the NeMo+PyTorch3D baseline approach. These pose estimation results show that NeMo utilizing VoGE achieved much better estimation accuracy than standard NeMo (i.e., NeMo+PyTorch3D).

FIG. 12 illustrates an ablation study for object pose estimation on PASCAL3D+. The coverage rate $\zeta$ is controlled when computing $\Sigma$, higher $\zeta$ gives larger $\Sigma$. W/o grad T(r) represent when the gradient from T(r) is blocked. Triangle meshes are converted to Gaussian ellipsoids, and a tunable parameter, coverage rate, are used to control the intersection rate between nearby Gaussian ellipsoids. The higher coverage rate may give a larger $\Sigma$, which makes the feature more smooth but also fuzzy, and vice versa. Furthermore, increasing $\Sigma$ may increase the rough performance under $$\frac{\pi}{6},$$

while reducing it may improve the performance under the more accurate evaluation threshold. The effect regarding the blocking part of the gradient may be ablated.

VoGE may be utilized for neural view matching may be conducted with VoGE. Neural view matching may retrieve images under a certain viewpoint given a viewpoint annotated anchor image. During the retrieve, a renderer may be used to synthesize deep neural features, under a given viewpoint. An experiment is conducted where twenty images are randomly selected from the car category in the PASCAL3D+ dataset as the anchor images. For each anchor image with viewpoint annotation θ, Three images are retrieved that are most likely to fit viewpoint θ+Δθ among the whole dataset. In total, fifteen different Δθ are evaluated. In the retrieval process, an ImageNet Pretrained Resnet50 backbone is used to extract features from the anchor image. Then the vertex corresponding features given viewpoint θ with correspond object geometry are sampled and re-rendered under the target viewpoint θ+Δθ. The synthesized feature map is compared with all feature maps extracted from the dataset.

Figure 13:
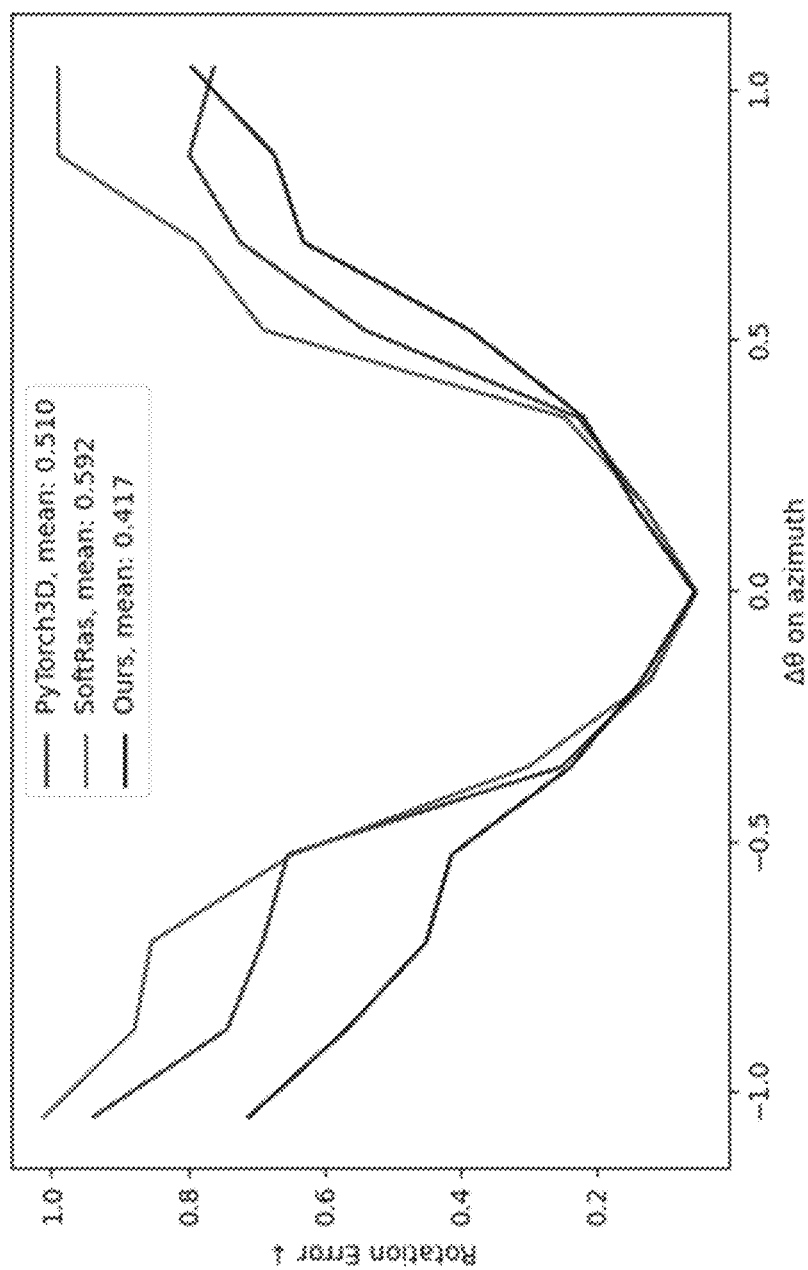
FIG. 13 illustrates viewpoint matching via neural feature synthesis results using VoGE compared to other techniques.

FIG. 13 illustrates viewpoint matching via neural feature synthesis results on PASCAL3D+ car. VoGE is compared with PyTorch3D and Soft Rasterizer. The results demonstrate that VoGE outperforms PyTorch3D and Soft Rasterizer, especially under those pose far from the anchor.

Figure 14:
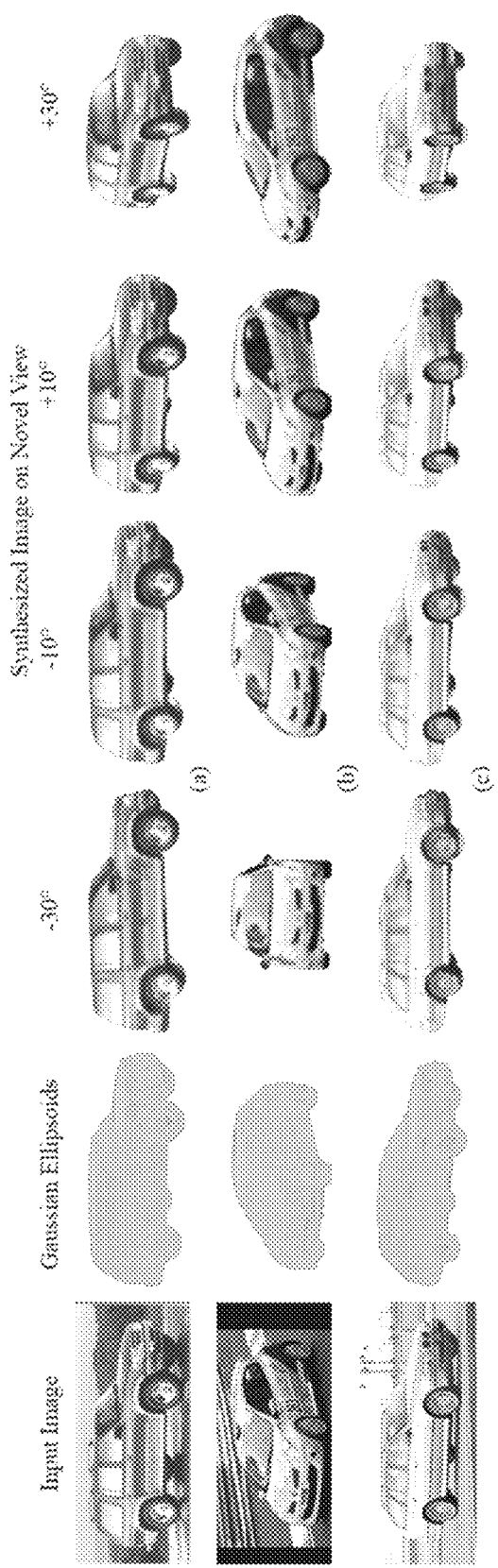
FIG. 14 illustrates sampling texture and re-rendering on novel view using VoGE.

VoGE may also be utilized to perform texture extraction and re-rendering. Textures are extracted from real images and then the extracted textures are re-rendered under novel viewpoints. The qualitative results are produced on the PASCAL3D+ dataset. Each image may be created independently so that there is no training included. The RGB value may be extracted for each kernel on the Gaussian ellipsoids given ground truth camera configuration. Then the Gaussian ellipsoids may be rendered with the extracted texture under a novel view, that can be increased or decreased based on the azimuth of the viewpoint (horizontal rotation). The qualitative results as shown in FIG. 14 demonstrate that VoGE has the texture extraction ability, even with a single image. Furthermore, details, like the numbers on object 1410, may be retained in high quality under the novel view. Even though the alignment between the Gaussian ellipsoids model and the object in the image may affect the quality of texture extraction, a single aligned geometry may already be enough for detailed texture extraction using VoGE.

Figure 15:
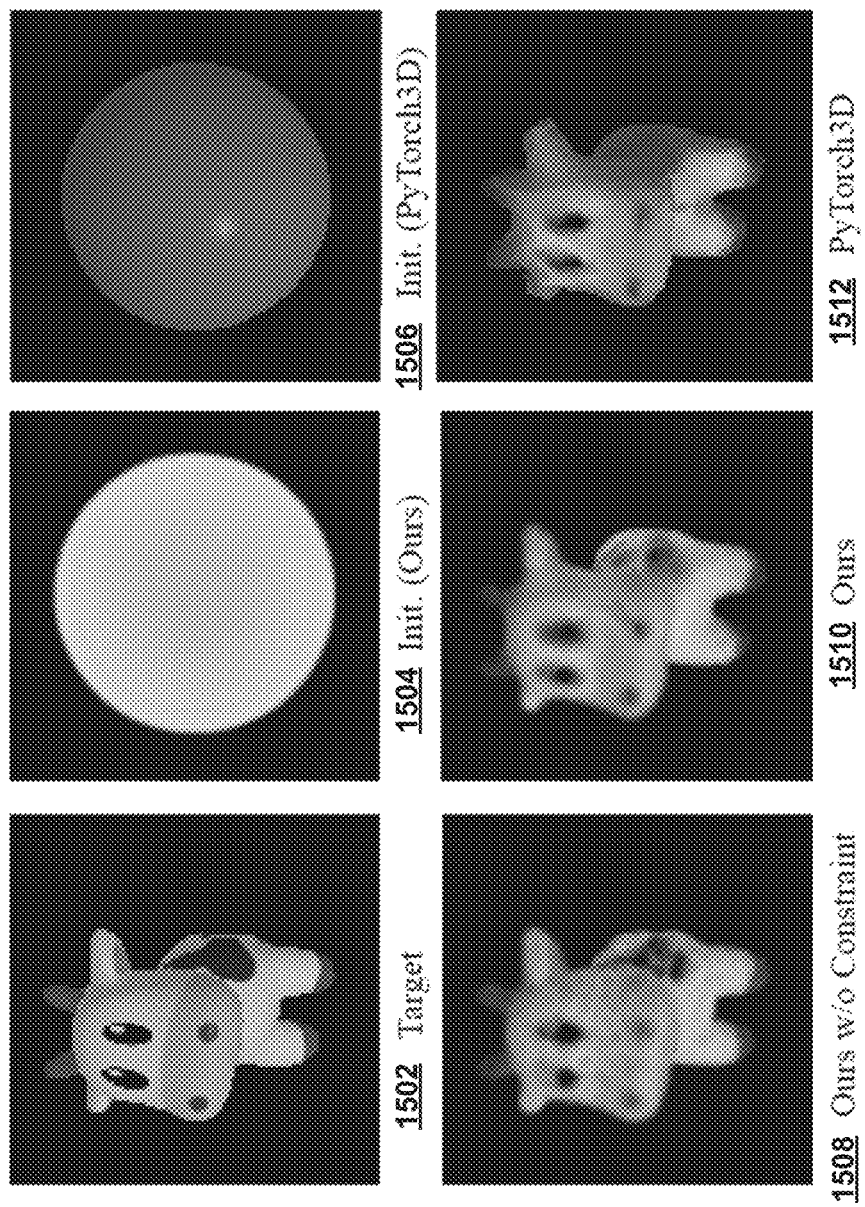
FIG. 15 illustrates that VoGE has a competitive ability on shape fitting.

VoGE may also be utilized to perform shape fitting. FIG. 15 illustrates shape fitting results using VoGE and PyTorch3D. Image 1502 is the optimization target, 1504 and 1506 are the initialization shape for VoGE and PyTorch3D, respectively. 1508 shows the result of VoGE without any shape consistency loss. 1510 and 1512 shows results of VoGE and PyTorch3 results, respectively, with the same shape consistency losses. FIG. 15 demonstrates that VoGE has a competitive ability regarding shape fitting. Specifically, as illustrated in image 1510, VoGE provides a better color prediction and a smoother object boundary than PyTorch3D.

Figure 16:
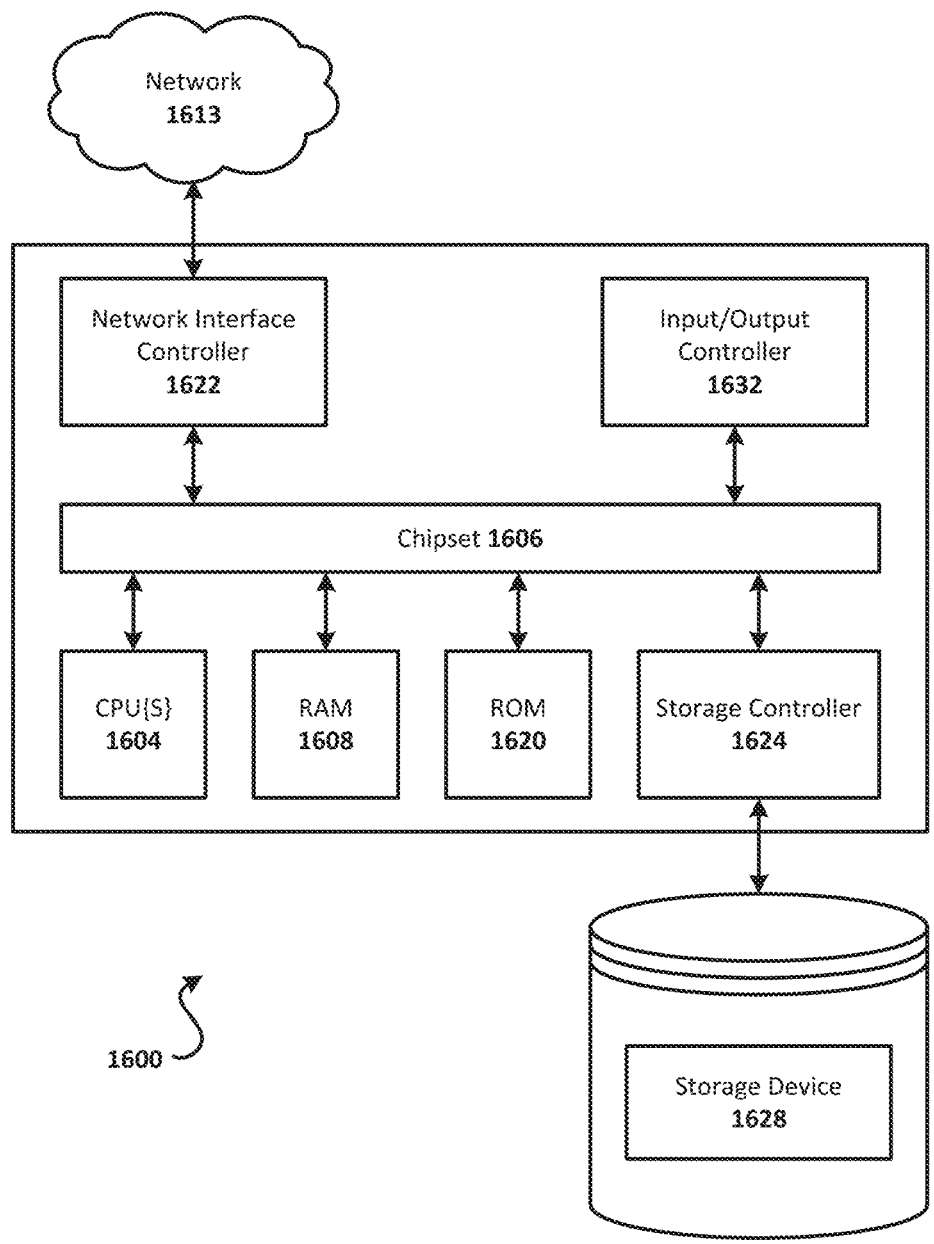
FIG. 16 illustrates an example computing device which may be used to perform any of the techniques disclosed herein.

FIG. 16 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1600 of FIG. 16. The computer architecture shown in FIG. 16 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1600 may include a baseboard, or "motherboard," which is a printed circuit board to which a multitude of components or devices may be connected by way of a system bus or other electrical communication paths. One or more central processing units (CPUs) 1604 may operate in conjunction with a chipset 1606. The CPU(s) 1604 may be standard programmable processors that perform arithmetic and logical operations necessary for the operation of the computing device 1600.

The CPU(s) 1604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

A chipset 1606 may provide an interface between the CPU(s) 1604 and the remainder of the components and devices on the baseboard. The chipset 1606 may provide an interface to a random-access memory (RAM) 1608 used as the main memory in the computing device 1600. The chipset 1606 may further provide an interface to a computer-readable storage medium, such as a read-only memory (ROM) 1620 or non-volatile RAM (NVRAM) (not shown), for storing basic routines that may help to start up the computing device 1600 and to transfer information between the various components and devices. ROM 1620 or NVRAM may also store other software components necessary for the operation of the computing device 1600 in accordance with the aspects described herein.

The computing device 1600 may operate in a networked environment using logical connections to remote computing nodes and computer systems through local area network (LAN). The chipset 1606 may include functionality for providing network connectivity through a network interface controller (NIC) 1622, such as a gigabit Ethernet adapter. A NIC 1622 may be capable of connecting the computing device 1600 to other computing nodes over a network 1116. It should be appreciated that multiple NICs 1622 may be present in the computing device 1600, connecting the computing device to other types of networks and remote computer systems.

The computing device 1600 may be connected to a storage device 1628 that provides non-volatile storage for the computer. The storage device 1628 may store system programs, application programs, other program modules, and data, which have been described in greater detail herein. The storage device 1628 may be connected to the computing device 1600 through a storage controller 1624 connected to the chipset 1606. The mass storage device 1628 may consist of one or more physical storage units. The mass storage device 1628 may comprise a management component 1010. A storage controller 1624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1600 may store data on the mass storage device 1628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1628 is characterized as primary or secondary storage and the like.

For example, the computing device 1600 may store information to the mass storage device 1628 by issuing instructions through a storage controller 1624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1600 may further read information from the mass storage device 1628 by detecting the physical states or characteristics of one or more particular locations within the physical storage units.

In addition to the mass storage device 1628 described above, the computing device 1600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1628 depicted in FIG. 16, may store an operating system utilized to control the operation of the computing device 1600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1628 may store other system or application programs and data utilized by the computing device 1600.

The mass storage device 1628 or other computer-readable storage media may also be encoded with computer-executable instructions, which, when loaded into the computing device 1600, transforms the computing device from a general-purpose computing system into a special-purpose computer capable of implementing the aspects described herein. These computer-executable instructions transform the computing device 1600 by specifying how the CPU(s) 1604 transition between states, as described above. The computing device 1600 may have access to computer-readable storage media storing computer-executable instructions, which, when executed by the computing device 1600, may perform the methods described herein.

A computing device, such as the computing device 1600 depicted in FIG. 16, may also include an input/output controller 1632 for receiving and processing input from a number of input devices, such as a keyboard, a mouse, a touchpad, a touch screen, an electronic stylus, or other type of input device. Similarly, an input/output controller 1632 may provide output to a display, such as a computer monitor, a flat-panel display, a digital projector, a printer, a plotter, or other type of output device. It will be appreciated that the computing device 1600 may not include all of the components shown in FIG. 16, may include other components that are not explicitly shown in FIG. 16, or may utilize an architecture completely different than that shown in FIG. 16.

As described herein, a computing device may be a physical computing device, such as the computing device 1600 of FIG. 16. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of rendering images using explicit object representation via rays tracing volume density aggregation, comprising:
reconstructing an object into a plurality of Gaussian ellipsoids, wherein the plurality of Gaussian ellipsoids correspond to a plurality of ellipsoidal Gaussian kernels, and each of the plurality of ellipsoidal Gaussian kernels is indicated by a density function;
determining a volume density of each of the plurality of Gaussian ellipsoids along each of a plurality of viewing rays;
determining a weight of each of the plurality of Gaussian ellipsoids based on the volume density;
synthesizing an image of the object using the determined weight on each pixel of the image to interpolate attributes of each of the plurality of Gaussian ellipsoids;
wherein the method further comprises:
computing an occupancy along each of the plurality of viewing rays via volume density aggregation; and
reweighting a contribution of each of the plurality of ellipsoidal Gaussian kernels.

2. The method of claim 1, further comprising:
reconstructing the object into the plurality of ellipsoidal Gaussian kernels based on:

$$\rho(X) = \sum_{k=1}^{K} \frac{1}{\sqrt{2\pi \cdot \|\Sigma_k\|_2}} e^{-\frac{1}{2}(X-M_k)^T \cdot \Sigma_k^{-1} \cdot (X-M_k)}$$

wherein $\rho(X)$ represents a density at a location X in a three-dimensional space, K represents a total number of the plurality of ellipsoidal Gaussian kernels, $M_k$ represents a center of k-th ellipsoidal Gaussian kernel, and $\Sigma_k$ represents a spatial variance matrix indicative of direction, size and shape of the k-th ellipsoidal Gaussian kernel.

3. The method of claim 1, further comprising:
sampling the plurality of viewing rays for each of the plurality of ellipsoidal Gaussian kernels with a camera configuration.

4. The method of claim 1, further comprising:
approximating the volume density aggregation based on determining a maximum value of the density function on each of the plurality of viewing rays.

5. The method of claim 1, further comprising:
transferring the plurality of ellipsoidal Gaussian kernels from an object coordinate to a camera coordinate by performing viewing transformation.

6. The method of claim 1, further comprising:
converting an existing representation of the object into the plurality of Gaussian ellipsoids.

7. A system of rendering images using explicit object representation via rays tracing volume density aggregation, comprising:
at least one processor; and
at least one memory comprising computer-readable instructions that upon execution by the at least one processor cause the computing device to perform operations comprising:
reconstructing an object into a plurality of Gaussian ellipsoids, wherein the plurality of Gaussian ellipsoids correspond to a plurality of ellipsoidal Gaussian kernels, and each of the plurality of ellipsoidal Gaussian kernels is indicated by a density function;
determining a volume density of each of the plurality of Gaussian ellipsoids along each of a plurality of viewing rays;
determining a weight of each of the plurality of Gaussian ellipsoids based on the volume density;
synthesizing an image of the object using the determined weight on each pixel of the image to interpolate attributes of each of the plurality of Gaussian ellipsoids;
wherein the operations further comprise:
computing an occupancy along each of the plurality of viewing rays via volume density aggregation; and
reweighting a contribution of each of the plurality of ellipsoidal Gaussian kernels.

8. The system of claim 7, the operations further comprising:
sampling the plurality of viewing rays for each of the plurality of ellipsoidal Gaussian kernels with a camera configuration.

9. The system of claim 7, the operations further comprising:
approximating the volume density aggregation based on determining a maximum value of the density function on each of the plurality of viewing rays.

10. The system of claim 7, the operations further comprising:
converting an existing representation of the object into the plurality of Gaussian ellipsoids.

11. A non-transitory computer-readable storage medium, storing computer-readable instructions that upon execution by a processor cause the processor to implement operations comprising:
reconstructing an object into a plurality of Gaussian ellipsoids, wherein the plurality of Gaussian ellipsoids corresponds to a plurality of ellipsoidal Gaussian kernels, and each of the plurality of ellipsoidal Gaussian kernels is indicated by a density function;
determining a volume density of each of the plurality of Gaussian ellipsoids along each of a plurality of viewing rays;
determining a weight of each of the plurality of Gaussian ellipsoids based on the volume density;
synthesizing an image of the object using the determined weight on each pixel of the image to interpolate attributes of each of the plurality of Gaussian ellipsoids;
wherein the operations further comprise:
computing an occupancy along each of the plurality of viewing rays via volume density aggregation; and
reweighting a contribution of each of the plurality of ellipsoidal Gaussian kernels.

12. The non-transitory computer-readable storage medium of claim 11, the operations further comprising:
sampling the plurality of viewing rays for each of the plurality of ellipsoidal Gaussian kernels with a camera configuration.

13. The non-transitory computer-readable storage medium of claim 11, the operations further comprising:
approximating the volume density aggregation based on determining a maximum value of the density function on each of the plurality of viewing rays.

14. The non-transitory computer-readable storage medium of claim 11, the operations further comprising:
converting an existing representation of the object into the plurality of Gaussian ellipsoids.

\* \* \* \* \*